United States Patent [19]

Matsumoto et al.

[11] Patent Number: 5,524,198
[45] Date of Patent: Jun. 4, 1996

[54] CHARACTER OR GRAPHIC PROCESSING METHOD AND APPARATUS

[75] Inventors: Hirotsugu Matsumoto, Tama; Masayuki Yoshida, Yokohama; Tetsuo Sakai, Kawasaki; Yasuhiko Sasaki, Chiba, all of Japan

[73] Assignee: Canon Kabushiki Kaisha, Tokyo, Japan

[21] Appl. No.: 958,723

[22] Filed: Oct. 9, 1992

[30] Foreign Application Priority Data

| Oct. 11, 1991 | [JP] | Japan | 3-263879 |
| Oct. 11, 1991 | [JP] | Japan | 3-263880 |
| Oct. 11, 1991 | [JP] | Japan | 3-263885 |
| Oct. 11, 1991 | [JP] | Japan | 3-263886 |

[51] Int. Cl.$^6$ .................................................. G06F 3/14
[52] U.S. Cl. .................................................. 395/157
[58] Field of Search ................................. 345/135, 144; 395/143, 150, 151, 141

[56] References Cited

U.S. PATENT DOCUMENTS

| 4,484,302 | 11/1984 | Cason et al. | 364/900 |
| 4,688,167 | 8/1987 | Agarwal | 364/200 |
| 4,827,358 | 5/1989 | Matsumoto | 358/296 |
| 5,086,481 | 2/1992 | Yoshida et al. | 382/22 |
| 5,109,352 | 4/1992 | O'Dell | 395/150 |
| 5,150,460 | 8/1992 | Onodera et al. | 395/151 |
| 5,151,954 | 9/1992 | Takai et al. | 382/41 |
| 5,226,117 | 7/1993 | Miklos | 395/157 |
| 5,228,121 | 7/1993 | Fontaine et al. | 395/145 |
| 5,233,685 | 8/1993 | Landes et al. | 395/151 |
| 5,251,293 | 10/1993 | Ishii et al. | 395/151 |

OTHER PUBLICATIONS

Screen Dumps From Microsoft® Windows® v.3.1, Microsoft Corporation, 1985–1992.
*Microsoft Windows User's Guide version 3.0*, Microsoft Corporation, 1985–1990, P.P.

*Primary Examiner*—Mark R. Powell
*Assistant Examiner*—U. Chauhan
*Attorney, Agent, or Firm*—Fitzpatrick, Cella, Harper & Scinto

[57] ABSTRACT

Using the character processing method having a plurality of processing schemes, character patterns are outputted in a plurality of windows using any of the processing schemes. The requirements of each window are discriminated, a processing scheme suited to a particular window is selected from the plurality of processing schemes in response to the requirements, and a character or graphic processed by the processing scheme selected for the window is outputted for each and every window.

40 Claims, 16 Drawing Sheets

| PROCESSING SCHEME | A | B | C | D |
|---|---|---|---|---|
| DATA FORMAT | B-SPLINE OR BEZIER | BEZIER | BEZIER | CIRCULAR ARC |
| MAXIMUM SIZE | LARGE | MEDIUM | SMALL | LARGE |
| QUALITY | ○ | ✕ | △ | ○ |
| SPEED | ✕ | ○ | ○ | △ |

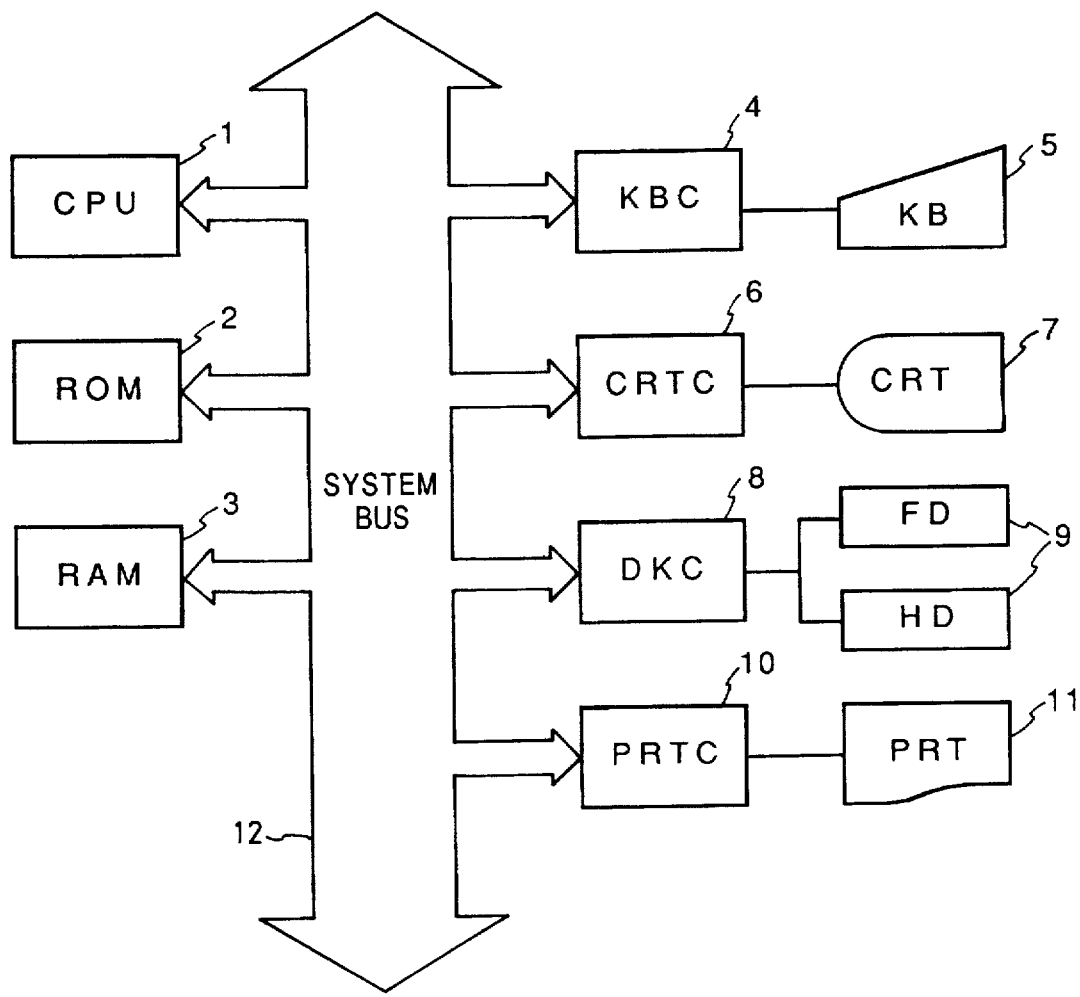
F I G. 1

TYPICAL MESSAGE

---

WINDOW MANAGEMENT MESSAGES

SEND IF THERE IS CHANGE IN WINDOW STATUS (1) WINDOW HAS CHANGED FROM ACTIVE TO INACTIVE (2) WINDOW HAS BEEN CREATED (3) WINDOW HAS BEEN CLOSED

---

INPUT MESSAGES

SEND WHEN APPLICATION HAS ACCEPTED INPUT FROM MOUSE OR KEYBORD (1) USER HAS CLICKED LEFT BUTTON OF MOUSE (2) USER HAS MOVED MOUSE

---

SYSTEM MESSAGES

SEND WHEN SYSTEM MENU, SCROLL BAR, ETC., HAS BEEN OPERATED

SCANNING DIRECTION

| PROCESSING SCHEME | A | B | C |
|---|---|---|---|
| QUALITY | ○ | × | △ |
| SPEED | × | ○ | ○ |

FIG. 9

| REQUIRED SPECIFICATIONS | a | b | c |
|---|---|---|---|
| QUALITY | ○ | △ | × |
| SPEED | × | △ | ○ |

FIG. 11

| | REQUIRED SPECIFICATIONS | | SELECTED SCHEME |
|---|---|---|---|
| | QUALITY | SPEED | |
| 1 | ○ | ○ | C |
| 2 | ○ | △ | C |
| 3 | ○ | × | A |
| 4 | △ | ○ | C |
| 5 | △ | △ | C |
| 6 | △ | × | A |
| 7 | × | ○ | B |
| 8 | × | △ | C |
| 9 | × | × | A |

SPECIFICATIONS - PROCESSING CORRESPONDENCE TABLE

FIG. 12

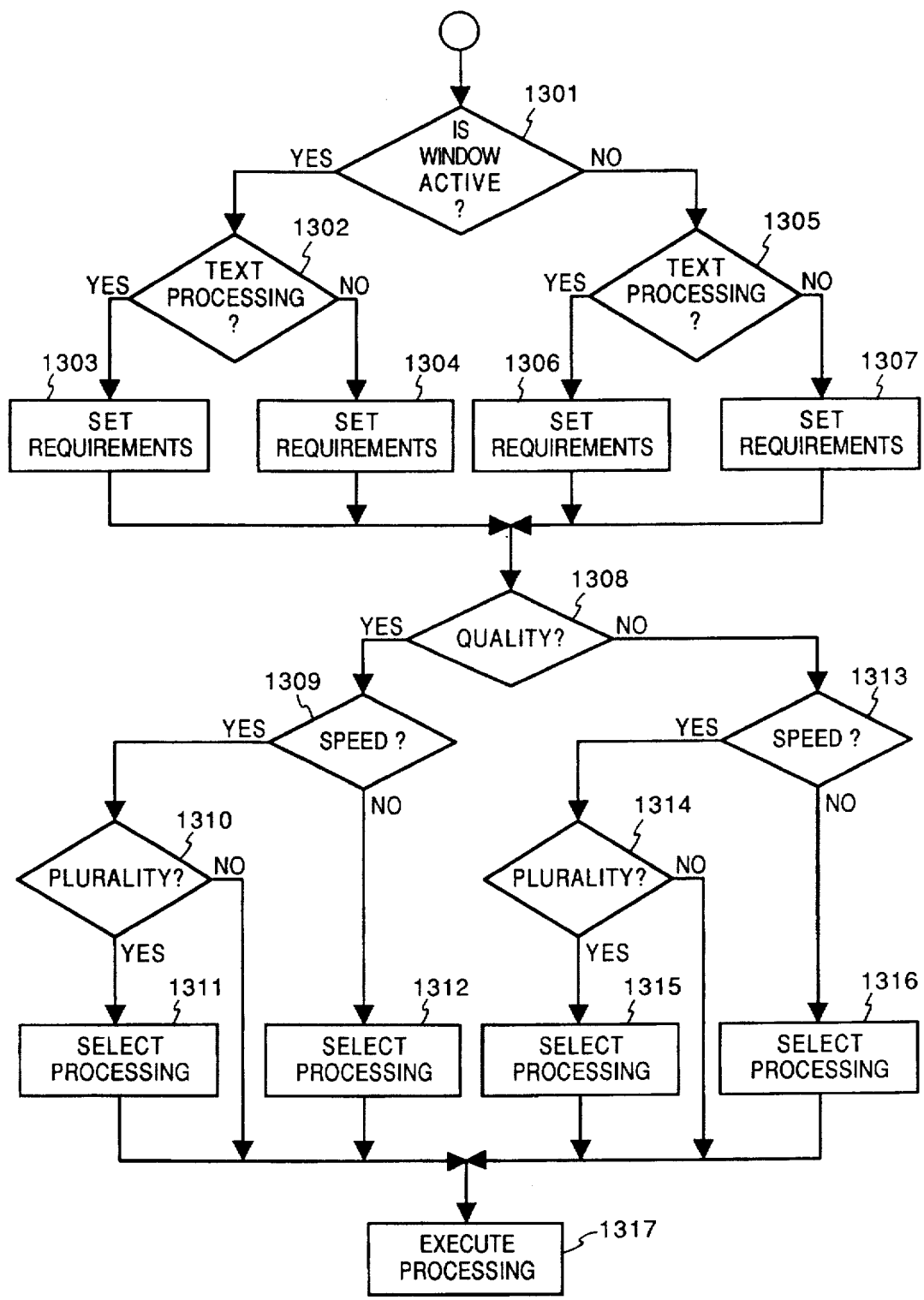
F I G. 13

| PROCESSING SCHEME | A | B | C | D |
|---|---|---|---|---|
| DATA FORMAT | B-SPLINE OR BEZIER | BEZIER | BEZIER | CIRCULAR ARC |
| MAXIMUM SIZE | LARGE | MEDIUM | SMALL | LARGE |
| QUALITY | ○ | × | △ | ○ |
| SPEED | × | ○ | ○ | △ |

FIG. 14

| REQUIRED SPECIFICATIONS | a | b | c |
|---|---|---|---|
| DATA FORMAT | BEZIER | BEZIER | CIRCULAR ARC |
| MAXIMUM SIZE | LARGE | SMALL | SMALL |
| QUALITY | ○ | △ | × |
| SPEED | × | △ | ○ |

FIG. 15

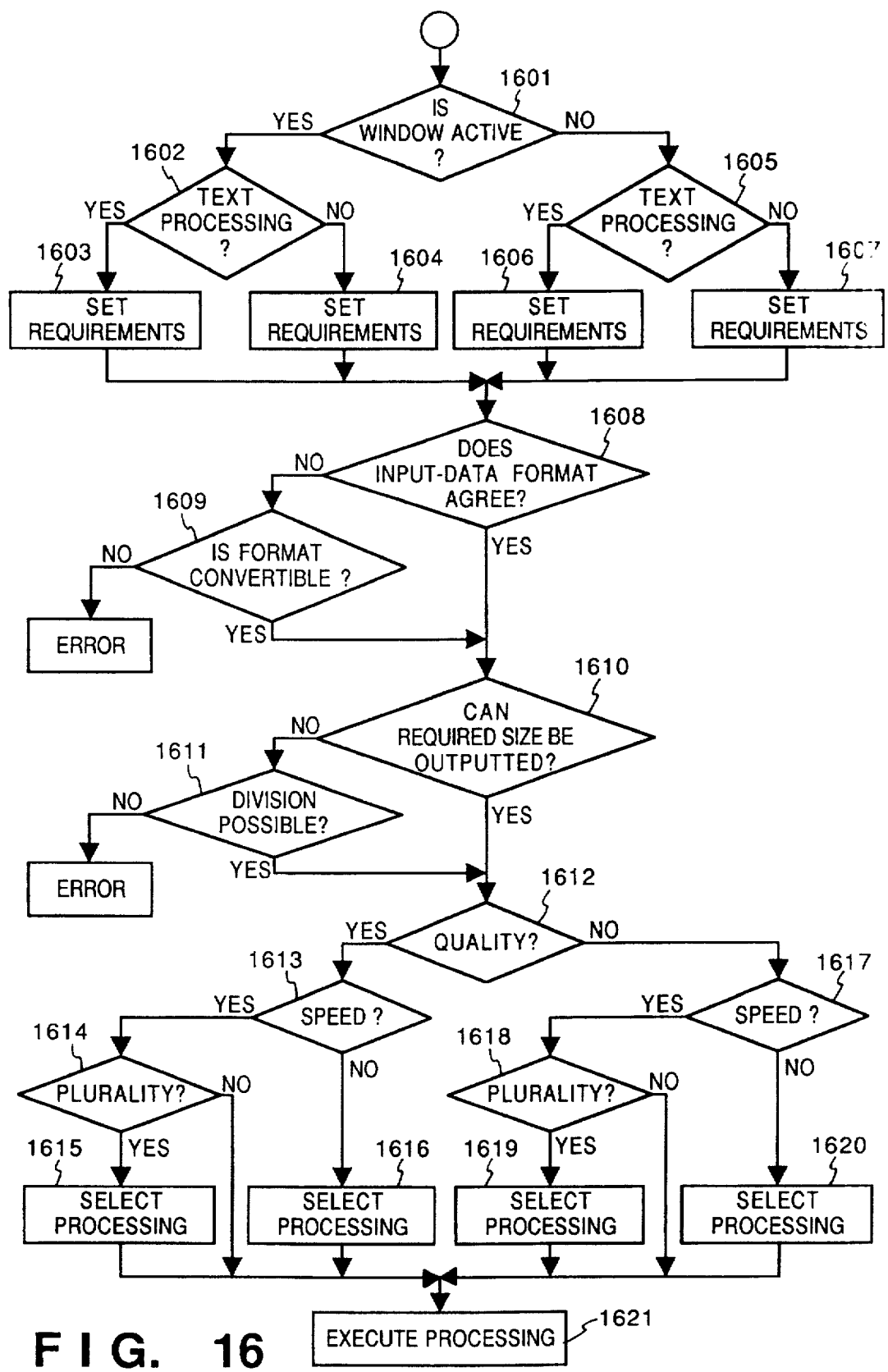
F I G. 16

| PROCESSING SCHEME | A | B | C | D |
|---|---|---|---|---|
| DATA FORMAT | B-SPLINE OR BEZIER | BEZIER | BEZIER | CIRCULAR ARC |
| REQUIRED MEMORY | SMALL | LARGE | SMALL | SMALL |
| MAXIMUM SIZE | LARGE | MEDIUM | SMALL | LARGE |
| QUALITY | ○ | × | △ | ○ |
| SPEED | × | ○ | ○ | △ |
| RECOMMENDED FONT | MING OR GOTHIC | MING | GOTHIC | BRUSH |

FIG. 17

| REQUIRED SPECIFICATIONS | a | b | c |
|---|---|---|---|
| DATA FORMAT | BEZIER | BEZIER | CIRCULAR ARC |
| ALLOWABLE MEMORY | SMALL | LARGE | LARGE |
| REQUIRED CHARACTER SIZE | LARGE | SMALL | SMALL |
| QUALITY | ○ | △ | × |
| SPEED | × | △ | ○ |
| RECOMMENDED FONT | MING | GOTHIC | BRUSH |

FIG. 18

CHARACTER OR GRAPHIC PROCESSING METHOD AND APPARATUS

BACKGROUND OF THE INVENTION

This invention relates to a character or graphics processing method in a system having a multiwindow display function, wherein the method is so adapted that a character or graphic expressed in a vector format is converted into a bit-map format in each window and outputted.

When a pattern in the form of a vector is converted into a bit-map format and outputted in a plurality of windows in a multiwindow or multi-task environment, a series of processing operations which include curve generation, dot formation along the generated curve and painting are all performed by software contained in one processing scheme.

However, when the processing operations of curve generation, dot formation along the generated curve and painting are all performed by software and by one and the same processing scheme with respect to a plurality of windows, the processing time becomes exorbitant and, as a result, the conversion of the vector-format data into the data of the bit-map format takes too long. When an attempt is made to shorten processing time, the processing for curve generation or the like inevitably becomes too coarse and, hence, there is a decline in output quality. Furthermore, since only one processing scheme is utilized even if the processing requirements for the various screens differ, another problem is that processing conforming to the requirements of each window cannot be executed.

SUMMARY OF THE INVENTION

Accordingly, an object of the present invention is to provide a character processing method having a plurality of processing schemes, in which character patterns are outputted in a plurality of windows using any of the processing schemes, wherein the requirements of each window are discriminated, a processing scheme suited to a particular window is selected from a plurality of processing schemes in response to the requirements, and a character or graphic processed by the processing scheme selected for the window is outputted for each and every window.

According to the present invention, the foregoing object is attained by providing a processing method, which has a plurality of character or graphics processing schemes, for outputting characters or graphics in a plurality of windows using each of the plurality of processing schemes, comprising the steps of obtaining, from each window, requirements regarding output mode in the particular window, and selecting one of the plurality of processing schemes, in dependence upon the requirements, for each corresponding window.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the basic construction of a character processing system according to an embodiment of the present invention;

FIG. 3 is a diagram showing a group of typical subroutines used in the system of FIG. 2;

FIG. 9 is a diagram in which the features of the individual processing schemes usable in the system of the embodiment are shown in the form of a table from the point of view of speed and quality;

FIG. 11 is a diagram showing a variation in features corresponding to three types of required specifications in the system of the embodiment;

FIG. 12 is a table showing correspondence between nine types of required specifications and three processing schemes used in the system of the embodiment;

FIG. 13 is a flowchart showing the control procedure of the embodiment;

FIG. 14 is a diagram in which the features of the individual processing schemes usable in the system of a first modification are shown in the form of a table from the point of view of data format, size of the developed character, speed and quality;

FIG. 15 is a diagram showing a variation in features corresponding to three types of required specifications in the system of the first modification;

FIG. 16 is a flowchart showing the control procedure of the first modification;

FIG. 17 is a diagram in which the features of the individual processing schemes usable in the system of a second modification are shown in the form of a table from the point of view of data format, required memory capacity, size of the developed character, speed, quality and recommended font;

FIG. 18 is a diagram showing a variation in features corresponding to three types of required specifications in the system of the second modification.

DESCRIPTION OF THE PREFERRED EMBODIMENT

An embodiment of the present invention will now be described with reference to the accompanying drawings.

FIG. 1 is a block diagram illustrating the basic construction of a character processing system to which the present invention is applied. The present character processing system may be a Japanese (or English) word processor, a work station or a computer system.

Figure 2:
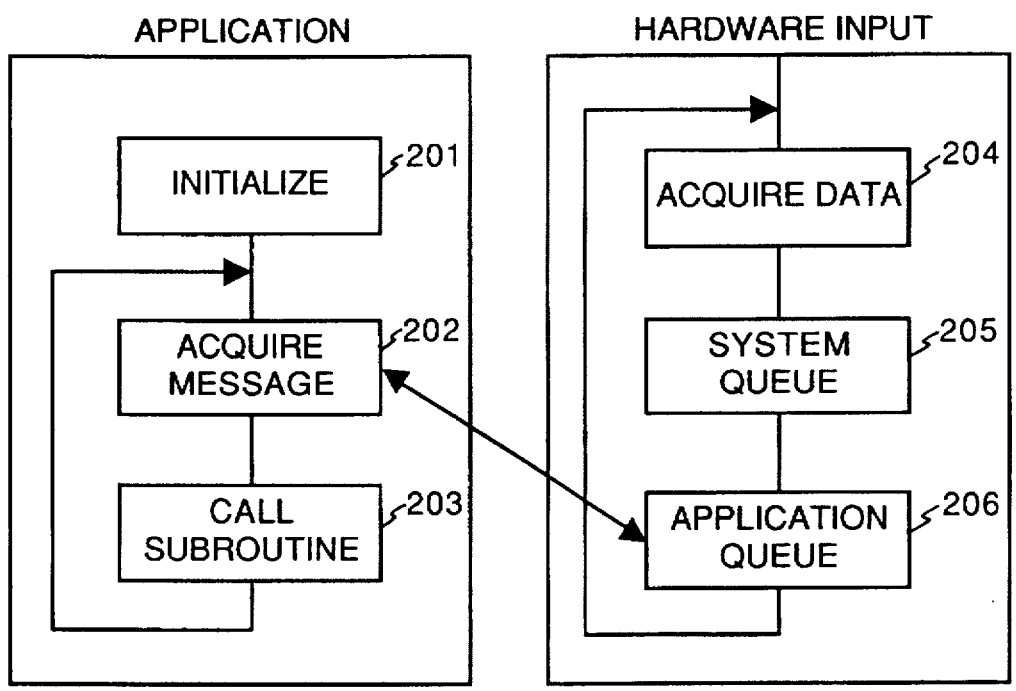
FIG. 2 is a diagram showing the basic flow of data of a window system having an event-driven structure according to the embodiment.

The system shown in FIG. 1 includes a CPU (central processing unit) 1 for controlling the overall system and executing various processing, a ROM (read-only memory) 2, which is a storage area for a system start-up program, character pattern data and the like, wherein the pattern data is used when a window system outputs the characters of a menu or the like, and a RAM (randomaccess memory) 3, which is used as a storage area for an application queue or system queue shown in FIG. 2 or as a storage area for data of unlimited use, after a window system has been loaded from the ROM or from an external memory device. Corresponding programs (expressed by flowcharts described below) and data are loaded in these areas for each of various kinds of processing operations. The system further includes a KBC (keyboard controller) 4 for accepting key input data from a keyboard KB and transmitting the data to the CPU 1. The inputted data is set in the application queue through the system queue, shown in FIG. 2, in the RAM 3. Also provided are a CRTC (display controller) 6 for presenting a display on a CRT display unit 7 when there is a display request from the window system, and external memory devices 9 such as an FD (floppy disk) or HD (hard disk) in which programs and data are stored in advance, referred to when necessary and loaded in the RAM 3 as required. There are also provided a DKC (disk controller) 8 for controlling a data transfer with the FD (or HD), a PRTC (printer controller) 10, a PRT (printer) 11 and a system bus 12, which forms a data path connecting the foregoing components.

The details of the embodiment constructed as set forth above will now be described.

The flowchart illustrated in FIG. 2 schematically illustrates the basic data flow of a window system used in the character processing system of FIG. 1. The window system has an event-driven structure.

Steps 204 through 206 in FIG. 2 illustrate the flow of processing within the window system in a case where an input is made via hardware, by way of example. Steps 201 through 203 illustrate an application program (e.g., software for a word processor) employed in the window system. The window system may be considered to be an OS.

Step 201 calls for initialization of the application program. This is followed by step 202, at which a message is acquired from the application queue area in RAM 3, and then by step 203, at which a subroutine corresponding to the message acquired at step 202 is called. Steps 202 and 203 are repeated until the window system ends.

At step 204, data is acquired from hardware such as the keyboard (KB 5 in FIG. 1) or a mouse, etc. The data acquired is stored temporarily in the system queue at step 205. Then, at step 206, the data is converted into a format usable by the application, after which the data is set in the application queue. The processing of steps 204 through 206 is repeated whenever there is an input from the input device.

FIG. 3 illustrates a group of typical subroutines corresponding to messages acquired at step 202. In FIG. 3, one corresponding subroutine is started in response to one window making a transition from an active state to an inactive state, by way of example.

Processing until character is displayed in window

The basic flow of data up to output of a character in a window will be described with reference to FIG. 4.

Figure 4:
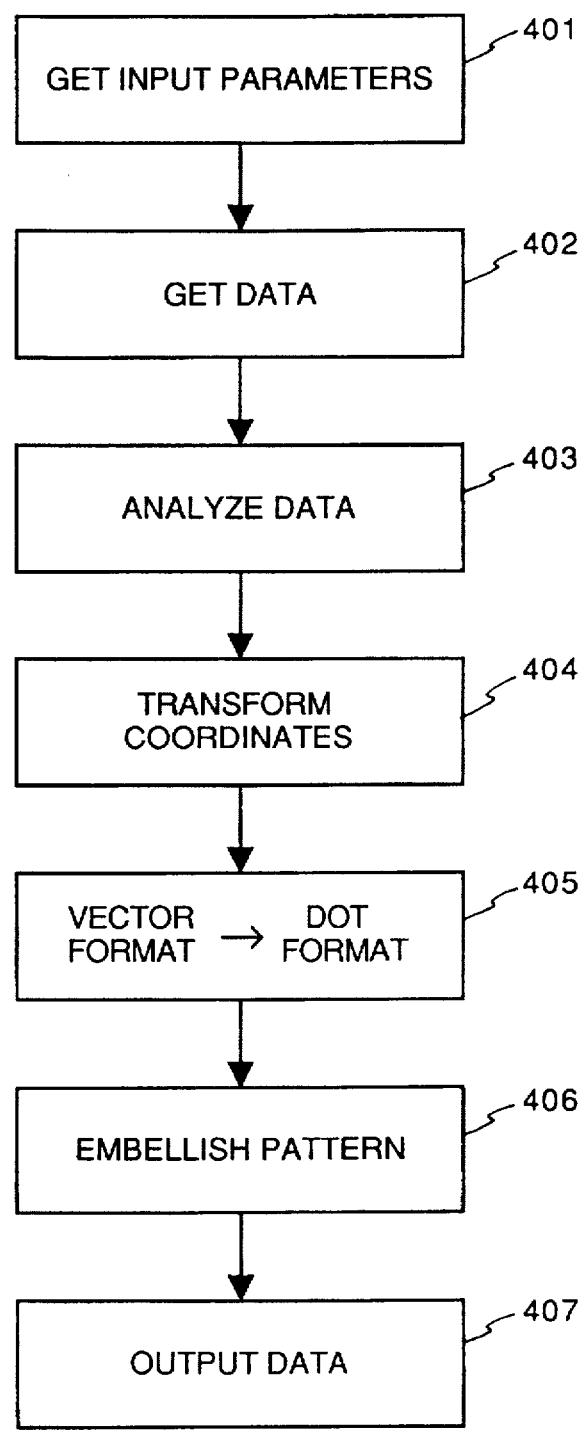
FIG. 4 is a flowchart illustrating the basic flow of data up to the point at which data is outputted in a window in the system of FIG. 3.

The flowchart of FIG. 4 illustrates the function of a font driver (not shown), which is present on the window-system side. This function is called by the subroutine call at step 203 in FIG. 2. More specifically, until step 401 is executed, the window generating subroutine is called by the subroutine call of steps 202, 203 on the side of the application program in FIG. 2, input parameters are acquired from the application queue (step 206) and the character-output subroutine is called. Control shifts to the font driver (not shown) at step 401. The input parameters are used as input parameters in FIGS. 13, 16, 19 and 20 described below. Examples of the types of parameters are "character code", "output size", "font", "type of embellishment" and "output format". These parameters include a flag indicating whether text processing is to be performed or not. The flag is used as a criterion for judging required specifications in FIGS. 11 and 12.

Step 402 in FIG. 4 calls for calculating, from the character code obtained at step 401, the leading address and data length of font data, which is the object of processing, from vector-format font data stored in the read-only memory (ROM) or in the hard disk 9, and for storing the address and the data length in the RAM of the system. The format of the font data at this time is one which includes coordinate data sequence, curve information and hint information. The hint information is auxiliary information which provides an output character with high quality. There are cases where compression is applied to the font data in order to reduce the amount of data.

The hint information is analyzed at step 403, whereby the font data is made to include only a coordinate sequence and straight-line/curve information. In a case where data that has been read in is compressed by an expedient such as the run-length technique, it is necessary to apply decompression prior to analysis at step 403.

At step 404, magnifications in vertical and horizontal directions in which enlargement or reduction is to be made is determined from the size of the character of interest obtained from step 401 and the size of the external shape of the font data already known. The enlargement/reduction magnifications in the vertical and horizontal directions are used to multiply all of the coordinate values of the coordinate sequence obtained from step 403, thereby creating a coordinate sequence of the size sought on the requesting side. Alternatively, in a case where there is a character embellishment such as an italic/mirror image at step 401, a fine transformation which includes a matrix equation representing the above-mentioned expansion/reduction magnification and the character embellishment is performed to obtain the desired coordinate value.

At step 405, font data in a bit-map format is created, for the character to be obtained, from the coordinate sequence and straight-line/curve information generated up to step 403. In a case where the font data is created from the straight-line information in the course of font-data creation, a desired point is obtained from a DDA (digital differential analyzer) generation algorithm and the point is formed in memory as a dot data. With regard to the curve information, a B-spline function is generated from this information and is temporarily converted into a collection of short straight lines, after which a desired point is obtained by a DDA generation algorithm similar to that for the straight lines, and this point is formed in memory as a dot. Alternatively, the points consisting of the B spline in the above-mentioned curve information are converted into points consisting of a three-dimensional bezier, and a three-dimensional Bezier function is generated therefrom. After a conversion is made into a collection of short straight lines, just as in the case of the B-spline function, a desired point is obtained from a DDA generation algorithm similar to that for the straight lines, and this point is formed in memory as a dot.

Figure 5:
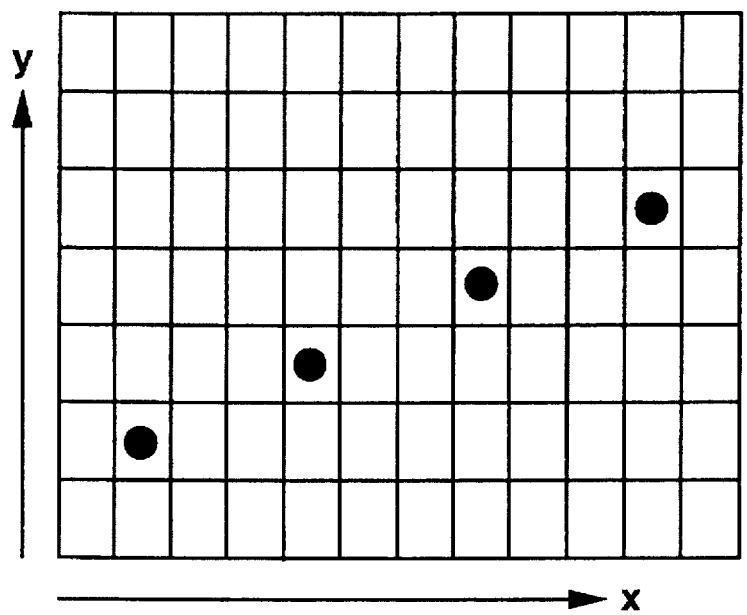
FIG. 5 is a diagram showing a method of forming dots in a plane in the embodiment.
Figure 6:
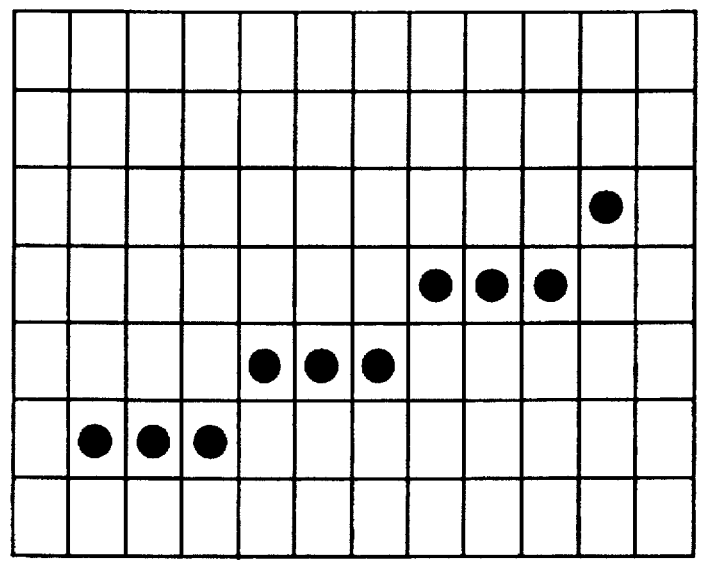
FIG. 6 is a diagram showing a method of forming dots in a plane in the embodiment.

As a method of forming the dots in memory, dots are formed in two memory planes by separate methods. A method of forming dots in one plane involves forming the dots in such a manner that two or more dots having the same y coordinate will not be formed, as shown in FIG. 5, in a case where a single line is drawn. According to this method of dot formation, dots are formed by an exclusive-OR (X-OR) operation. More specifically, in a case where a dot to be formed has already been struck (a black dot), this dot vanishes (becomes a white dot). If a dot has not yet been struck (i.e., in case of a white dot), the dot is struck (becomes a black dot). As for the method of forming dots in the other plane, dots are formed in such a manner that dots do not become separated by even one dot, i.e., in such a manner that dots are rendered continuous, as shown in FIG. 6. This method of dot formation relies upon an OR operation. More specifically, regardless of whether or not a dot to be formed has or has not already been struck, the dot is struck.

Figure 7:
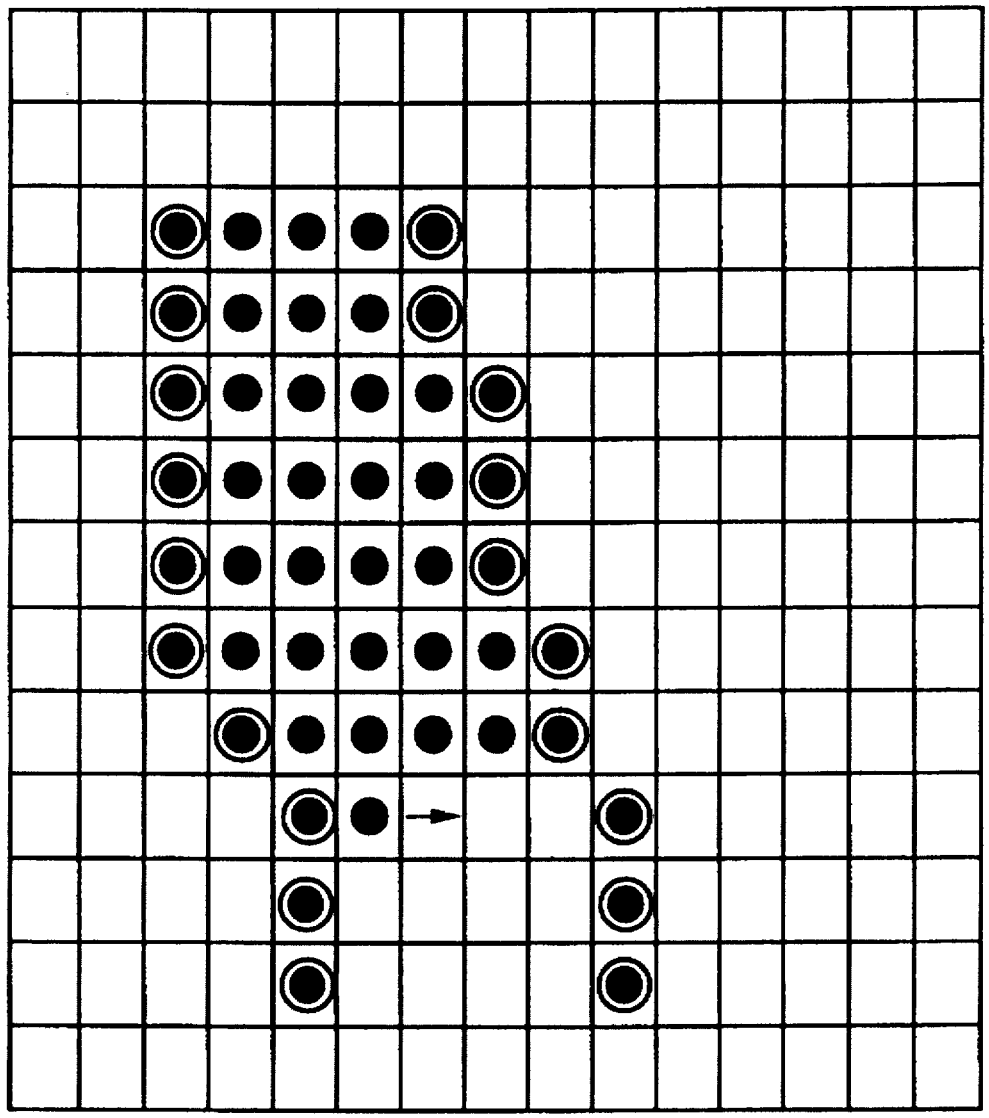
FIG. 7 is a diagram showing a painting method in the embodiment.

When dot-formation processing has thus been completed for all data, painting processing is then executed. In this processing, the processing is executed only in a plane (of the kind shown in FIG. 5) in which dot formation has been performed by the X-OR operation in the dot-formation processing. According to the painting method, scanning is performed in the y direction (the horizontal direction), and the entirety of the space between the dots formed by a single strike and the dots formed previously are filled with dots, as illustrated in FIG. 7. Further, when a dot is discovered as scanning is performed in the y direction, the space between this dot and the dot discovered next is filled with dots. When this processing has been performed from the left side to the right side for all of the y coordinates, painting processing is terminated. In FIG. 7, dots formed by the X-OR technique are indicated by the double circles to simplify the description.

Figure 8:
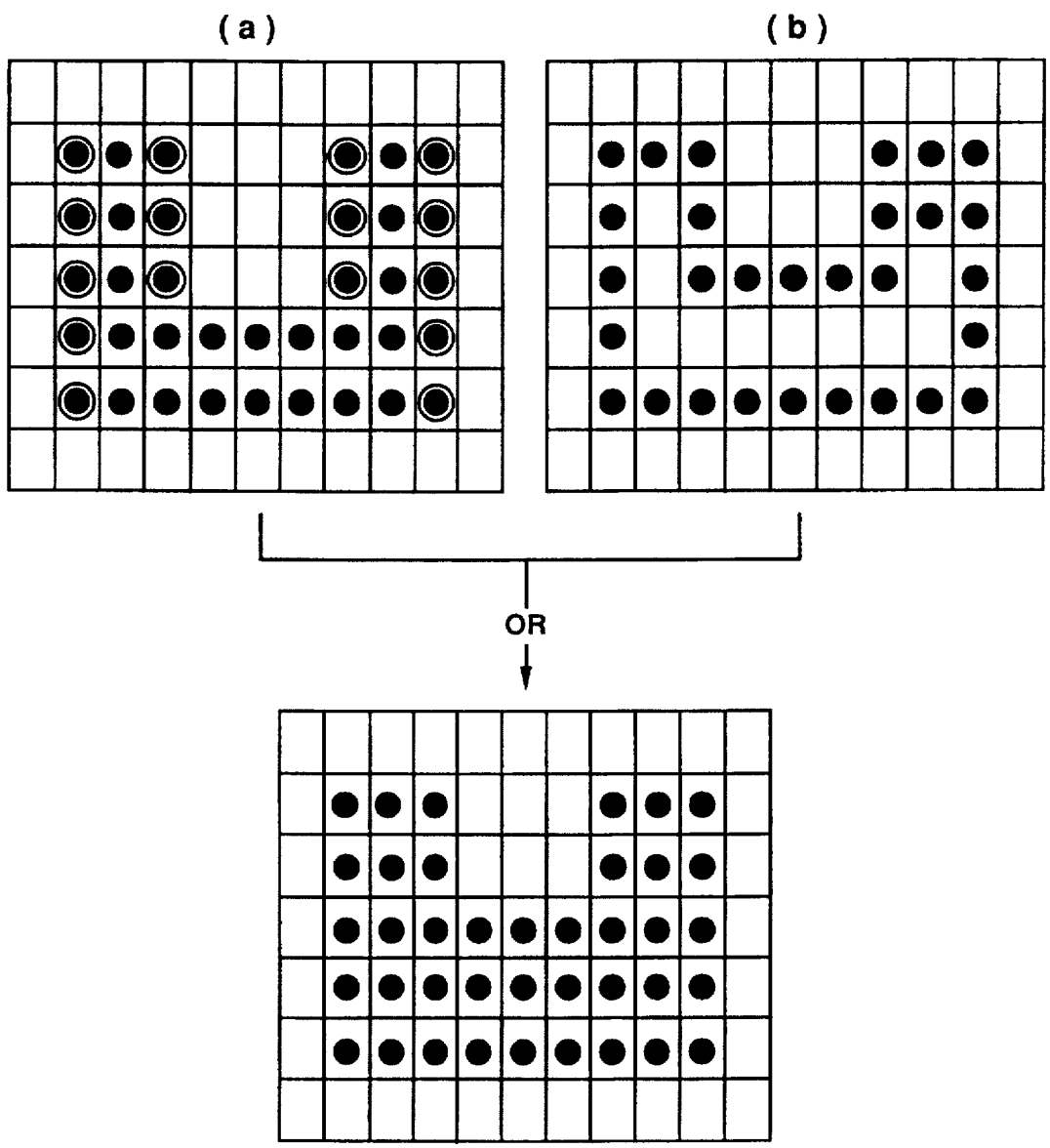
FIG. 8 is a diagram showing a painting method in the embodiment.

At step 405, the OR is taken between the plane in which painting has been performed and the plane in which dot formation has been performed by the above-mentioned OR operation, as shown in FIG. 8. In FIG. 8, (a) is a portion of a font pattern obtained by painting described in connection with FIG. 7, and (b) is a portion of a font pattern obtained by the OR method described in connection with FIG. 7. This OR synthesizing processing is terminated to end the processing of step 405.

At step 406, the character of an all-black pattern formed at step 405 is subjected to pattern embellishment such as shading or netting in dependence upon the type of embellishment obtained from step 401.

At step 407, processing is executed for transferring data to the requesting side. This involves performing processing by applying a scan conversion appreciate for the scanning format (ROW or COLUMN) on the requesting side.

The foregoing is a description of the general flow of character processing in the character processing system shown in FIGS. 1 and 2.

Character processing for dealing with windows

The characterizing operation for a case where this character processing system is applied to a multiwindow system will now be described in greater detail.

FIG. 9 is a diagram showing the features (quality and processing speed) of the individual processing schemes provided in advance for this character processing system. In FIG. 9, O indicates that the features of quality and processing speed are good, X indicates that these features are no good, and Δ means that the features are tolerable. A characterizing feature of the present system is that any one of the processing schemes can be selected for each window. Processing scheme A is used in application software for word processors or the like and is for making a conversion from data in a vector format to data in a bit-map format by means of software. In processing scheme A, data expressed by a straight line+B-spline function or data expressed by a straight line+three-dimensional Bezier function can be processed as the input-data format. Though this processing scheme excels in terms of quality, it is somewhat slow in speed. The features of this processing scheme are features that, stated in terms of the prior art, are generally generated in a case where it is attempted to realize machine-independent processing.

Processing schemes B and C are processing schemes added anew in an attempt to eliminate the drawbacks of processing scheme A, and they simplify the three-dimensional bezier development processing. The processing schemes B and C are executed by hardware or software. In the processing scheme B, data expressed by a straight line+three-dimensional Bezier function can be processed as the input-data format. Though quality declines since integer arithmetic operation is performed, this scheme has the highest processing speed among the schemes dealt with here. In the processing scheme C, data expressed by a straight line+three-dimensional Bezier function can be processed as the input-data format. Though the quality is not as good as that of processing scheme A, it is better than that of processing scheme B since fixed-point arithmetic is performed, and this scheme is quicker in terms of speed as well. The functions of these processing schemes are functions added to the aforesaid font driver, which is not shown.

Window requirement specifications

Figure 10A:
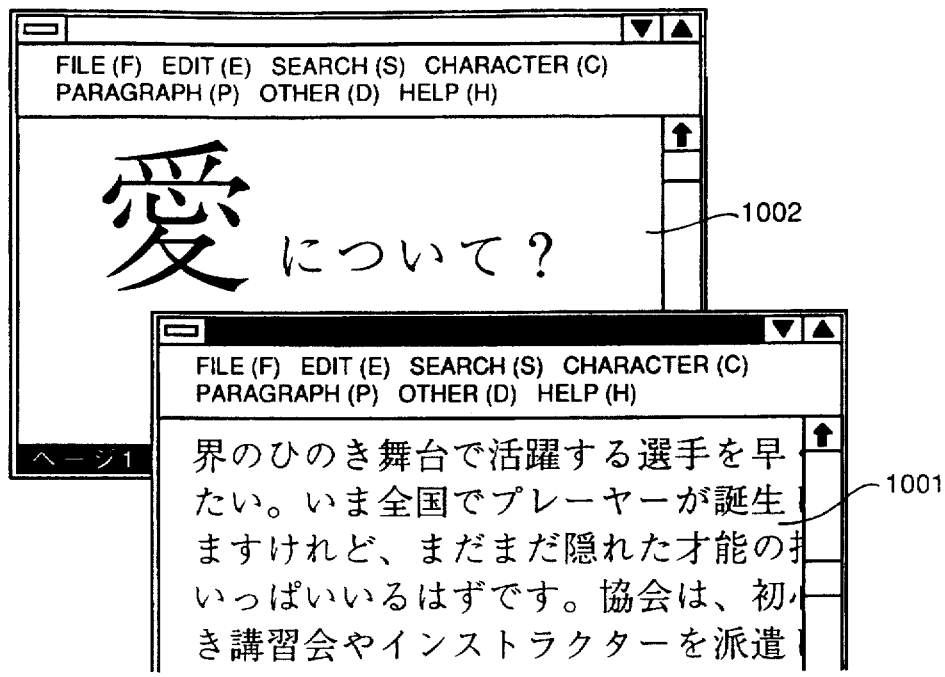
FIGS. 10A and 10B are diagrams showing a change in a display when there is a change in the active state of a window in the system of the embodiment.
Figure 10B:
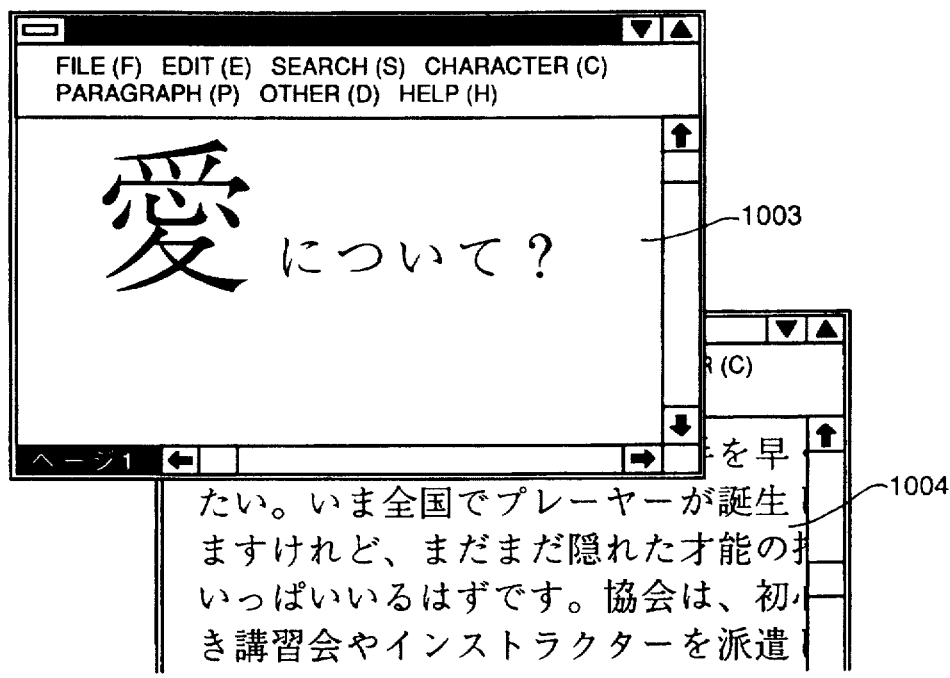

FIGS. 10A and 10B illustrate examples of two windows displayed on the CRT 7 of the system shown in FIG. 1. As mentioned above, it is necessary that the window system shown in FIG. 2 be started by the time these windows are displayed. The required specifications of each window to be set for the windows will be described with reference to FIGS. 10A, 10B, 11 and 12.

In FIG. 10A, a window 1001 is an active window (a window in a state in which it can be edited). In this window, Japanese text comprising a large number of kanji and hiragana characters are displayed. With this window, an input of Japanese text is performed. Internally, inputted character data is processed as text. As for the specifications required in the window 1001, quality will not be a problem so long as the level is such that characters can be easily distinguished. However, processing speed is given the highest priority. A window 1002 is an inactive window (a window in a state in which it cannot be edited). Here processing for modifying the layout is performed. The required specifications of window 1002 are such that since the window is in a state in which it cannot be edited, no problems arise even if there is some reduction in speed. However, since slight positional adjustments are made owing to the fact that processing for modifying the layout is performed, this window will be meaningless unless the quality is good.

In FIG. 10B, windows 1003 and 1004 have relationship which is the opposite of that of windows 1001 and 1002. That is, the window 1003 is active and the window 1004 is inactive. In the active window 1003, processing for layout modification is performed and not text processing. Consequently, this is a window in which both quality and speed are given priority; if either suffers, the window will be meaningless. However, since the window 1004 is inactive (in a state in which it cannot be edited), a processing scheme in which quality and speed do not pose particular problems will suffice.

Thus, the windows have required specifications conforming to the processing performed internally. In addition, the required specifications for both of these windows change depending upon the state in which the window has been placed.

FIG. 11 is a diagram showing three types of such required specifications in the form of a table. Required specification a is one in which quality is given priority but speed is not. For example, this corresponds to the window 1002 in FIG. 10. Required specification b requires that both quality and speed be fairly good and corresponds to the window 1003 in FIG. 10. The specification c gives priority to speed but not to quality and corresponds to the window 1001 in FIG. 10, by way of example.

FIG. 12 is a table (referred to as required-specification/ processing-scheme correspondence table) which illustrates the correspondence between processing schemes and required specifications for each of nine required specifications each Capable of being represented by two factors (each of which has three levels, namely O, $\Delta$ and X), namely quality and speed. This table is stored in the RAM 3 of FIG. 1. The features of each of the processing schemes shown in FIG. 9 and each of the required specifications shown in FIG. 12 are compared in advance, and the processing schemes suited to these required specifications are indicated as "Selected Scheme" in the right-hand column of the table in FIG. 12 for each of the required specifications.

It goes without saying that the flag indicative of text processing in the aforementioned parameters is used as a criterion for selecting the processing scheme.

In the table of FIG. 12, the processing scheme C satisfies the required specifications 1, 2, 4, 5 and 8. The reason for this is as follows: In processing scheme, C, the capabilities of the specifications are quality=$\Delta$ and speed=O, as shown in FIG. 9. However, in the selection of the processing scheme bound by the aforementioned parameters, the operator considers that the processing scheme C, for example, also satisfies the requirements quality, speed=OO, O$\Delta$, $\Delta$O, $\Delta\Delta$, X$\Delta$, as a result of which the table of FIG. 12 is created.

With regard to which processing scheme should be selected when a certain window requires any of the required specifications a, b, c shown in FIG. 11, it should be evident from FIG. 12 that the processing scheme A is selected if this window requires the specification a (=OX), in conformity with the table shown in FIG. 12. If the specification b (=$\Delta\Delta$) is required, then the processing scheme C is selected. If the specification c (=XO) is required, then the processing scheme B is selected.

The procedure for making these selections will be described later.

Determining required specification and selecting processing scheme

The flow of processing up to the decision on the required specifications of a window and the selection of suitable processing schemes in a system having the aforesaid three processing schemes A, B, C will be described taking the flowchart of FIG. 13 as an example. FIG. 13 represents the process in which the window system starts up the font driver and the font driver selects the processing scheme.

FIG. 13 is a flowchart showing the manner in which a processing scheme is selected in a case where there are three processing schemes having the capability to make a vector-to-dot conversion in the conversion processing of step 405 (FIG. 4) for converting a vector format to a dot format.

Step 1301 in FIG. 13 calls for a determination as to whether a window displayed is active (e.g., a window corresponding to window 1001 or 1003 in FIG. 10). If the window is active, the program proceeds to step 1302; otherwise (in which case the window corresponds to window 1002 or 1004), the program proceeds to step 1305.

If the program proceeds to step 1302 because the window has been determined to be active, then it is determined whether the object of editing in this window is text (which corresponds to window 1001). If it is found at step 1302 that text is to be edited, then, at step 1303, a setting is made to the effect that speed should be emphasized and quality de-emphasized as far as the required specifications are concerned. The program then proceeds to step 1308. If it is found at step 1302 that what is to be edited is not text (which corresponds to window 1003), then a setting is made at step 1304 to the effect that both speed and quality should be emphasized as far as the required specifications are concerned.

On the other hand, if it is found at step 1301 that the window is not active, the program proceeds to step 1305. Here, if it is decided that text is to be edited (which corresponds to window 1004), as in the case of step 1302, then required specifications are set at step 1306 to the effect that both quality and speed should be de-emphasized. If it is found at step 1305 that what is to be edited is not text (which corresponds to window 1003), then a setting is made at step 1307 to the effect that quality should be emphasized and speed de-emphasized.

The required specifications of the particular window are thus decided. This is followed by steps 1308 through 1316, which constitute a procedure for controlling selection of the processing schemes.

At step 1308, it is determined whether there is a processing scheme in which the required specifications set at steps 1301 through 1307 above are satisfied in terms of quality. If there is at least one processing scheme which satisfies the required specifications in terms of quality based upon the table of FIG. 12 and the required specifications of the window, then the program proceeds to step 1309. If there is not even one such processing scheme, the program proceeds to step 1313.

If there is at least one processing scheme which satisfies the required specifications in terms of quality, it is determined at step 1309 whether there is a processing scheme which satisfies the required specifications in terms of speed. If there is at least one processing scheme which satisfies the required specifications in terms of speed, then the program proceeds to step 1310. If there is not even one processing scheme which satisfies the required specifications, then the program proceeds to step 1312.

If, as a result of the foregoing processing, there is at least one processing scheme which satisfies the required specifications in terms of both quality and speed, it is determined at step 1310 whether there are a plurality of such processing schemes. If there is only one, then this single processing scheme is decided upon and the program proceeds to step 1317. If there are two or more processing schemes, then the program proceeds to step 1311.

In a case where there are a plurality of processing schemes which satisfy the required specifications, it is decided at step 1311 which of the processing schemes should be selected. Though there are a variety of techniques which can be used to select the processing scheme, it will be assumed here that the first appearing processing scheme that satisfies the required specifications is selected. It goes without saying that the first appearing processing scheme mentioned here may be the processing scheme in which the conditions are satisfied first or a processing scheme in which the conditions are satisfied last when the table shown in FIG. 12 is searched.

When it is determined at step 1309 that there is not one processing scheme which satisfies the required specifications in terms of speed, the program proceeds to step 1312. When it is determined that the requirements in terms of quality are satisfied, the processing scheme determined at step 1308 is selected at step 1312 and the program then proceeds to step 1317.

If it is found at step 1308 that not a single processing scheme which satisfies the required specifications in terms of quality exists, then it is determined at step 1313 whether there is a processing scheme which satisfies the required specifications in terms of speed. If there is at least one processing scheme which satisfies the required specifications in terms of speed, then the program proceeds to step 1314. If there is not even one processing scheme which satisfies the required specifications, then the program proceeds to step 1316.

If a NO answer is obtained at step 1313, i.e., if it is determined that not even a single processing scheme which satisfies the required specifications exists, then the first appearing processing scheme among the processing schemes which exist is selected at step 1316, after which the program proceeds to step 1317.

If it is found at step 1313 that there is at least one processing scheme which satisfies the required specifications in terms of speed, then it is determined at step 1314 whether there are a plurality of such processing schemes. If there is only one, then this one processing scheme is decided upon and the program proceeds to step 1317. If there are a plurality of such processing schemes, e.g., if there are a plurality of candidates in which the processing schemes selectable in a case where speed is emphasized are C and B, then the program proceeds to step 1315. In a case where there are a plurality of processing schemes which satisfy the required specifications in terms of speed, it is decided at step 1315 which of the processing schemes should be selected. Here the first appearing processing scheme which satisfies the required specifications is selected, after which the program proceeds to step 1317.

Processing similar to that of step 405 in FIG. 4 is performed at step 1317 by the selected processing scheme. It should be noted that no problems are encountered here even if the methods differ slightly depending upon the processing scheme.

As set forth above, the processing scheme that is to be selected is determined based upon the required specifications of the window and the features of the processing scheme, whereby development is capable of proceeding in the processing scheme nearest that which satisfies the required specifications and it is possible to output desired data conforming to the output unit in terms of quality and speed.

Modification: adding data format and maximum size as required specifications

In the technique shown in FIGS. 11 through 13, processing schemes are decided based upon the required factors of quality and speed. In the modification described below, an example will be described in which data format and maximum character size are added to the criteria as factors for deciding the processing scheme. The basic flow of processing according to this modification is in line with the foregoing embodiment.

FIG. 14 is a diagram showing the features of four types of processing schemes provided in this modification.

Here the processing scheme A is capable of processing data expressed by a straight line+B-spline function or data expressed by a straight line+three-dimensional Bezier function as the input-data format. This processing scheme excels in terms of quality, is fairly slow in terms of speed and is capable of developing characters to a sufficiently large size.

The processing scheme B is capable of processing data expressed by a straight line+three-dimensional Bezier function as the input-data format. Quality declines because integer processing is performed, but this processing scheme has the highest speed among the schemes handled here. The size to which characters can be developed is small.

The processing scheme C is capable of processing data of a format expressed by a straight line+three-dimensional Bezier function as the input-data format. Though this processing scheme does not present quality as good as that of processing scheme A, the quality is better than that of processing scheme B since fixed-point arithmetic is performed, and this scheme is quicker in terms of speed as well. The size to which characters can be developed is small.

The processing scheme D is capable of processing data of a format expressed by a straight line+circular-arc function as the input-data format. Though this processing scheme does not present speed as high as that of processing scheme A, its processing speed is high and it is capable of developing characters to a large size. The foregoing is in line with FIG. 11.

FIG. 15 is a diagram in which three examples (a, b, c) of required specifications in this embodiment are shown in a table from the viewpoints of input-data format, character size capable of being developed, quality and speed. In this modification also, it goes without saying that there is a table for selection purposes of the kind shown in FIG. 12.

As for specification a, the requirement with regard to input-data format is a straight line+three-dimensional Bezier function, and the requirement regarding the output unit is that quality have the highest priority. A window which has such requirements is one which requires a high output quality even if some processing speed is sacrificed. In the specification a, outputs up to a large size are made as the output specifications.

As for specification b, the requirement with regard to input-data format is a straight line+three-dimensional Bezier function. A window of specification b is one which requires that both quality and speed be given priority. An output unit which produces an output from this window is meaningless if either quality or speed is lacking. Outputs only of small size are produced as the output specifications.

As for specification c, the input-data format is a straight line+circular arc. With regard to the required specifications of the window, quality does not pose a problem but speed is given the highest priority. Outputs up to a large size are made as the output specifications.

The flow of processing in the system of the modification having the foregoing processing schemes will be described taking the flowchart of FIG. 16 as an example. FIG. 16 is a flowchart showing the flow through which a processing scheme is selected in a case where the processing schemes at step 405 in FIG. 4 are four in number.

Step 1601 in FIG. 16 calls for a determination as to whether a window displayed is active (e.g., a window which accepts inputs from the user). If the window is active, the program proceeds to step 1602; otherwise, the program proceeds to step 1605. It is determined at step 1602 whether the object of editing in this window is text. If text is to be edited, then, at step 1603, a setting is made to the effect that speed should be emphasized and quality de-emphasized as far as the required specifications are concerned. The program then proceeds to step 1608. If it is found at step 1602 that what is to be edited is not text, then a setting is made at step 1604 to the effect that both speed and quality should be emphasized as far as the required specifications are concerned.

On the other hand, if it is found at step 1601 that the window is not active, the program proceeds to step 1605. Here it is determined whether text is to be edited, as in the case of step 1602. If it is determined that text is to be edited, then required specifications are set at step 1606 to the effect that both quality and speed should be de-emphasized. If it is found at step 1605 that what is to be edited is not text, then a setting is made at step 1607 to the effect that quality should be emphasized and speed de-emphasized.

At step 1608, it is determined whether the given processing schemes include a processing scheme in which the font-data format of an input agrees with a data format capable of being processed. If there is at least one processing scheme in which agreement is obtained, then the program proceeds to step 1610. If there is not even one such processing scheme, the program proceeds to step 1609.

If the program proceeds to step 1609, this represents a case in which the given processing schemes do not contain a single processable data format with respect to the font-data format of the input. However, even if even a single processable data format does not exist, there are cases where processing is made possible by converting the data format. Therefore, it is determined at step 1609 whether there is a processing scheme of a type in which a format conversion is capable of being made from the font-data format of the input to the data format possessed by the processing scheme. If a processing scheme capable of a format conversion exists, then the program proceeds to step 1610. If such a processing scheme does not exist, it is judged that processing is impossible and an error output is produced. If a change in the quality and speed shown in FIG. 15 occur owing to a format conversion in the case where the program proceeds from step 1609 to step 1610, the values in the table are rewritten.

If the program proceeds to step 1610, this means that there is at least one processing scheme in which the data in the font-data format of the input is capable of being processed. It is determined at step 1610 whether the above-mentioned processing schemes contain a processing scheme in which the size of a character of interest is capable of being developed. If the character size is capable of being developed, then the program proceeds to step 1612; otherwise, the program proceeds to step 1611.

If it is determined at step 1610 that the data size of interest is incapable of being developed, then the program proceeds to step 1611. Here is determined whether the processing schemes of interest contain a processing scheme in which division processing is possible. If at least one such processing scheme exists, the program proceeds to step 1612; otherwise, an error message is produced.

At step 1612, it is determined whether there is a processing scheme in which the required specifications set at steps 1601 through 1607 above are satisfied in terms of quality. If there is at least one processing scheme which satisfies the required specifications in terms of quality, then the program proceeds to step 1613. If there is not even one such processing scheme, the program proceeds to step 1617.

If it is found at step 1612 that there is a processing scheme which satisfies the required specifications in terms of quality, it is determined at step 1613 whether there is a processing scheme which satisfies the required specifications in terms of speed. If there is at least one processing scheme which satisfies the required specifications in terms of speed, then the program proceeds to step 1614. If there is not even one processing scheme which satisfies the required specifications, then the program proceeds to step 1616.

If there is at least one processing scheme which satisfies the required specifications in terms of both quality and speed, it is determined at step 1614 whether there are a plurality of such processing schemes. If there is only one, then this single processing scheme is decided upon and the program proceeds to step 11621. If there are two or more processing schemes, then the program proceeds to step 1615.

In a case where there are a plurality of processing schemes which satisfy the required specifications, it is decided at step 1615 which of the processing schemes should be selected. Here the first appearing processing scheme that satisfies the required specifications is selected.

When it is determined that there is not one processing scheme which satisfies the required specifications in terms of speed, the processing scheme which satisfies the requirement in terms of quality is selected at step 1616 and the program then proceeds to step 1621.

If it is found that not a single processing scheme which satisfies the required specifications in terms of quality exists, then it is determined at step 1617 whether there is a processing scheme which satisfies the required specifications in terms of speed. If there is at least one processing scheme which satisfies the required specifications in terms of speed, then the program proceeds to step 1618. If there is not even one processing scheme which satisfies the required specifications, then the program proceeds to step 1620.

If it is determined that not even a single processing scheme which satisfies the required specifications exists, then the first appearing processing scheme among the processing schemes which exist is selected at step 1620, after which the program proceeds to step 1621.

If it is found that there is at least one processing scheme which satisfies the required specifications in terms of speed, then it is determined at step 1618 whether there are a plurality of such processing schemes. If there is only one, then this one processing scheme is decided upon and the program proceeds to step 1612. If there are two or more of such processing schemes, then the program proceeds to step 1619.

In a case where there are a plurality of processing schemes which satisfy the required specifications in terms of speed, it is decided at step 1619 which of the processing schemes should be selected. Here the first appearing processing scheme which satisfies the required specifications is selected, after which the program proceeds to step 1621.

Processing similar to that of step 405 in FIG. 4 is performed at step 1621 by the selected processing scheme. It should be noted that no problems are encountered here even if the methods differ slightly depending upon the processing scheme.

As set forth above, the processing scheme that is to be selected is decided based upon the data-input format and input specifications as well as the required specifications and the features of the processing schemes, whereby development is capable of proceeding in the processing scheme nearest that which satisfies the input-data format, input specifications and required specifications, and it is possible to output desired data in terms of quality and speed.

Second modification

In the first modification set forth above, the method of deciding processing schemes is described in detail with regard to the input-data format, input specifications and the required specifications of the output unit.

In the second modification, an example will be described in which the factor of memory capacity capable of being used by a processing scheme in an output unit such as the printer 11 or the RAM 3 of the apparatus proper and the factor of suitability/unsuitability of a processing scheme with regard to the font of the output are added as factors for deciding the processing scheme.

FIG. 17 illustrates the feature of each of four processing schemes (A, B, C, D) capable of being used in the second modification.

In FIG. 17, the processing scheme A is capable of processing data expressed by a straight line+B-spline function or data expressed by a straight line+three-dimensional Bezier function as the input-data format. This processing scheme excels in terms of quality, is fairly slow in terms of speed and is capable of developing characters to a sufficiently large size. In addition, the recommended font of processing scheme A is the Ming style or Gothic style.

The processing scheme B is capable of processing data expressed by a straight line+three-dimensional Bezier function as the input-data format. Quality declines because integer processing is performed, but this processing scheme has the highest speed among the schemes handled here. The size to which characters can be developed is small. The recommended font of processing scheme B is the Ming style alone.

The processing scheme C is capable of processing data of a format expressed by a straight line+three-dimensional bezier function as the input-data format. Though this processing scheme does not present quality as good as that of processing scheme A, the quality is better than that of processing scheme B since fixed-point arithmetic is performed, and this scheme is quicker in terms of speed as well. The size to which characters can be developed is small, and the recommended font of processing scheme C is the Gothic style alone.

The processing scheme D is capable of processing data of a format expressed by a straight line+circular-arc function as the input-data format. This processing scheme is excellent in terms of quality but does not present a speed as high as that of processing scheme A. However, its processing speed is high and it is capable of developing characters to a large size. The recommended font of processing scheme D is the brush style alone.

FIG. 18 is a diagram showing three examples (a, b, c) of specifications required in the second modification. According to the second modification, the factors of the specifications are six in number, namely input-data format, usable memory capacity, character size capable of being developed, quality and speed.

Figure 19:
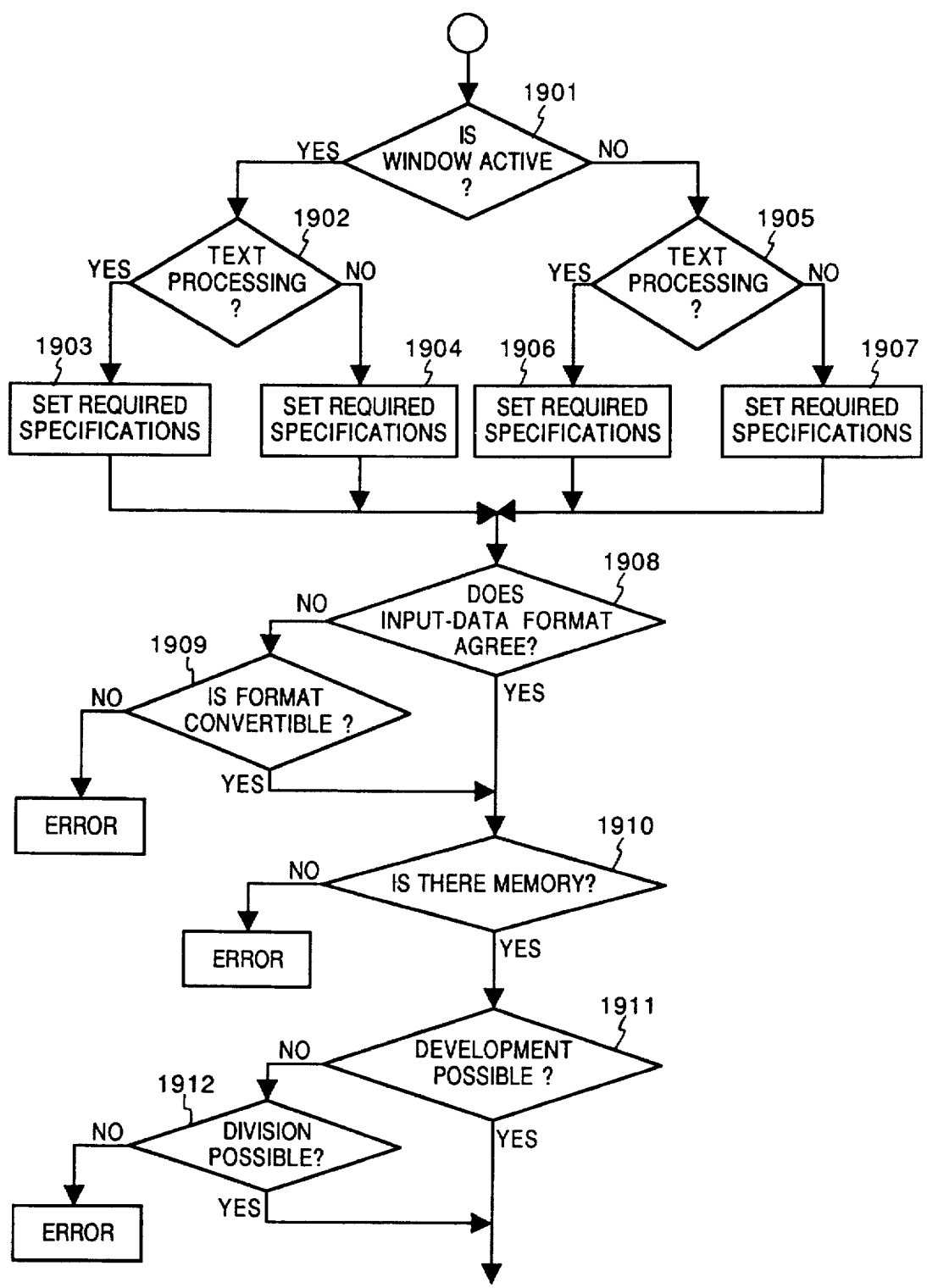
FIGS. 19 and 20 are flowcharts illustrating the control procedure of the second modification.
Figure 20:
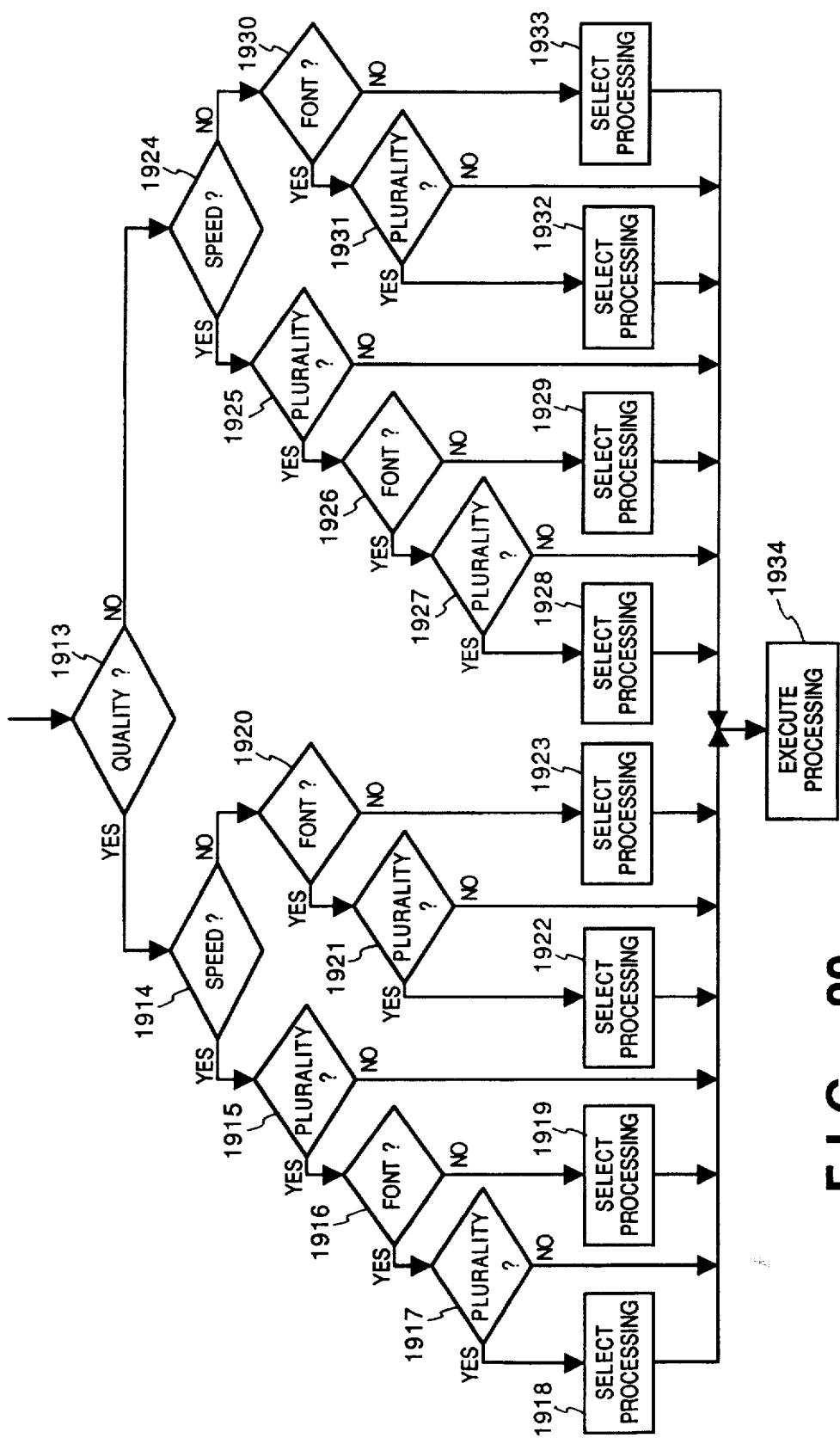

In a system having the four above-mentioned processing schemes and the three types of required specifications and conditions, the flow of control will be described taking the flowchart of FIG. 19 as an example FIG. 19 is a flowchart showing the flow through which a processing scheme is selected in a case where the processing schemes at step 405 in FIG. 4 are four in number.

Step 1901 in FIG. 19 calls for a determination as to whether a window displayed is active (e.g., a window which accepts inputs from the user). If the window is active, the program proceeds to step 1902; otherwise, the program proceeds to step 1905. It is determined at step 1902 whether the object of editing in this window is text. If text is to be edited, then, at step 1903, a setting is made to the effect that speed should be emphasized and quality de-emphasized as far as the required specifications of the window are concerned. The program then proceeds to step 1908. If it is found at step 1902 that what is to be edited is not text, then a setting is made at step 1904 to the effect that both speed and quality should be emphasized as the required specifications.

On the other hand, if it is found at step 1901 that the window is not active, the program proceeds to step 1905. Here it is determined whether text is to be edited, as in the case of step 1902. If it is determined that text is to be edited, then required specifications are set at step 1906 to the effect that both quality and speed should be de-emphasized. If it is found at step 1905 that what is to be edited is not text, then a setting is made at step 1907 to the effect that quality should be emphasized and speed de-emphasized.

At step 1908, it is determined whether the given processing schemes include a processing scheme in which the font-data format of an input agrees with a data format capable of being processed. If there is at least one processing scheme in which agreement is obtained, then the program proceeds to step 1910. If there is not even one such processing scheme, the program proceeds to step 1909.

If the program proceeds to step 1909, this represents a case in which the given processing schemes do not contain a single processable data format with respect to the font-data format of the input. However, even if even a single processable data format does not exist, there are cases where processing is made possible by converting the data format. Therefore, it is determined at step 1909 whether there is a processing scheme of a type in which a format conversion is capable of being made from the font-data format of the input to the data format possessed by the processing scheme. If a processing scheme capable of a format conversion exists, then the program proceeds to step 1910. If such a processing scheme does not exist, it is judged that processing is impossible and an error output is produced. If a change in the quality and speed shown in FIG. 17 occur owing to a format conversion in the case where the program proceeds from step 1909 to step 1910, the values in the table are rewritten.

If the program proceeds to step 1910, this means that there is at least one processing scheme in which the data in the font-data format of the input is capable of being processed. At step 1910, an inquiry is made into the size of the memory usable for the window system, and it is determined whether the processing scheme that is capable of developing characters at the present time will be capable of developing characters within the allowable capacity of the development memory deemed to be usable. If there is at least one processing scheme capable of developing characters within the allowable limits, then the program proceeds to step 1911. If even one such processing scheme does not exist, it is judged that processing is impossible and a message to this effect is outputted as an error message.

If there is at least one processing scheme which processes data in the font-data format of the input and, moreover, the memory capacity is satisfied (YES at steps 1908 and 1910), then it is determined at step 1911 whether the size of interest is capable of being developed in the processing schemes capable of executing processing. If development is possible, the program proceeds to step 1913; otherwise, the program proceeds to step 1912.

If it is found at step 1911 that the data size of interest is incapable of being developed, then the program proceeds to step 1912. Here is determined whether the processing schemes of interest at the time of this step contain a processing scheme in which division processing is possible. If at least one such processing scheme exists, the program proceeds to step 1913; otherwise, an error message is produced.

At step 1913, it is determined whether there is a processing scheme in which the required specifications set at steps 1901 through 1907 above are satisfied in terms of quality. If there is at least one processing scheme which satisfies the required specifications in terms of quality, then the program proceeds to step 1914. If there is not even one such processing scheme, the program proceeds to step 1924.

If it is found at step 1913 that there is a processing scheme which satisfies the required specifications in terms of quality, it is determined at step 1914 whether there is a processing scheme which satisfies the required specifications in terms of speed. If there is at least one processing scheme which satisfies the required specifications in terms of speed, then the program proceeds to step 1915. If there is not even one processing scheme which satisfies the required specifications, then the program proceeds to step 1920.

If there is at least one processing scheme which satisfies the required specifications in terms of both quality and speed, it is determined at step 1915 whether there are a plurality of such processing schemes. If there is only one, then this single processing scheme is decided upon and the program proceeds to step 1934. If there are two or more processing schemes, then the program proceeds to step 1916.

If there are a plurality of processing schemes capable of performing processing at this time, the suitability/unsuitability of processing based upon the font is judged for each of the processing schemes at step 1916. If there is a processing scheme suited to a font to be outputted by at least one processing scheme, the program proceeds to step 1917. If there is not even one processing scheme suited to the font to be outputted, then the program proceeds to step 1919.

If there is at least one processing scheme which satisfies all of the required specifications in terms of quality, speed and font, then it is determined at step 1917 whether there are a plurality of such processing schemes. If there is only one, then this processing scheme is decided upon and the program proceeds to step 1934. If there are two or more of such processing schemes, then the program proceeds to step 1918.

In a case where there are a plurality of processing schemes which satisfy the required specifications, it is decided at step 1918 which of the processing schemes should be selected. Here the first appearing processing scheme that satisfies the required specifications is selected.

If there are a plurality of processing schemes which satisfy the required specifications in terms of quality and speed, then the first appearing processing scheme that satisfies the required specifications is selected at step 1919 and the program proceeds to step 1934.

If it is found at step 1920 that there is a processing scheme suited to the font to be outputted, then the program proceeds to step 1921. If there is not even one processing scheme suited to the font to be outputted, the program proceeds to step 1923. Here the first appearing processing scheme is selected from among the processing schemes which satisfy the required specifications in terms of quality and then the program proceeds to step 1934.

If there is at least one processing scheme which satisfies the required specifications in terms of both quality and font, then it is determined at step 1921 whether there are a plurality of such processing schemes. If there is only one, then this processing scheme is decided upon and the program proceeds to step 1934. If there are two or more of such processing schemes, then the program proceeds to step 1922.

In a case where there are a plurality of processing schemes which satisfy the required specifications in terms of quality and font, the first appearing processing scheme that satisfies the required specifications is selected at step 1922 and the program proceeds to step 1934.

It is determined at step 1924 whether there is a processing scheme which satisfies the required specifications in terms of speed. If there is at least one processing scheme which satisfies the required specifications in terms of speed, then the program proceeds to step 1925. If there is not even one processing scheme which satisfies the required specifications, then the program proceeds to step 1930.

If there is at least one processing scheme which satisfies the required specifications in terms of speed, it is determined at step 1925 whether there are a plurality of such processing schemes. If there is only one, then this single processing scheme is decided upon and the program proceeds to step 1934. If there are two or more processing schemes, then the program proceeds to step 1926.

If there are a plurality of processing schemes capable of performing processing at this time, the suitability/unsuitability of processing based upon the font is judged for each of the processing schemes at step 1926. If there is a processing scheme suited to a font to be outputted by at least one processing scheme, the program proceeds to step 1927. If there is not even one processing scheme suited to the font to be outputted, then the program proceeds to step 1929.

If there is at least one processing scheme which satisfies the required specifications in terms of both speed and font, then it is determined at step 1927 whether there are a plurality of such processing schemes. If there is only one, then this processing scheme is decided upon and the program proceeds to step 1934. If there are two or more of such processing schemes, then the program proceeds to step 1928.

In a case where there are a plurality of processing schemes which satisfy the required specifications, it is decided at step 1928 which of the processing schemes should be selected. Here the first appearing processing scheme that satisfies the required specifications is selected.

If there are a plurality of processing schemes which satisfy the required specifications in terms of speed, then the first appearing processing scheme that satisfies the required specifications is selected at step 1929 and the program proceeds to step 1934.

If it is found at step 1930 that there is a processing scheme suited to the font to be outputted, then the program proceeds to step 1931. If there is not even one processing scheme suited to the font to be outputted, the program proceeds to step 1933. Here the first appearing processing scheme is selected from among the processing schemes which satisfy the required specifications in terms of quality and then the program proceeds to step 1934.

If there is at least one processing scheme which satisfies the required specifications in terms of both quality and font, then it is determined at step 1931 whether there are a plurality of such processing schemes. If there is only one, then this processing scheme is decided upon and the program proceeds to step 1934. If there are two or more of such processing schemes, then the program proceeds to step 1932.

In a case where there are a plurality of processing schemes which satisfy the required specifications in terms of quality and font, the first appearing processing scheme that satisfies the required specifications is selected at step 1932 and the program proceeds to step 1934.

Processing similar to that of step 405 in FIG. 4 is performed at step 1934 by the selected processing scheme. It should be noted that no problems are encountered here even if the methods differ slightly depending upon the processing scheme.

Thus, in a case where there are a plurality of processing schemes and a character pattern is outputted in a plurality of windows by using any of the processing schemes, the requirements of each window are judged. Then, in conformity with the requirements, one of the plurality of processing schemes is selected with respect to each window by using quality, speed, input-data format, memory capacity, output size or font as a reference. In addition, as a result, it is possible to output a character for each window under the optimum conditions in conformity with the particular circumstances. Alternatively, it is possible to output a character under optimum conditions in variable fashion depending upon whether each window is active or inactive.

The present invention can be modified in various ways within the scope of the claims:

For example, in the embodiment and modifications set forth above, the present invention is applied to a system which processes the Japanese language. However, the invention obviously is applicable to systems using other languages (such as English) as well. In such case, the fonts would be, for example Courier, Times, etc.

Further, in the foregoing embodiment and modifications, the invention is applied to a system comprising one display unit or printing apparatus. However, the invention may be applied to a system which includes a plurality of display units or printing apparatus. It also goes without saying that the invention is applicable to a case in which the above-mentioned effects are attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An output controller which controls an outputting device to output characters displayed in a window, comprising:
   first discriminating means for discriminating a state of a displayed window;
   determining means for determining an output specification required for the window, on the basis of a discrimination by the first discriminating means; and
   selecting means for selecting, based on the output specification determined by the determining means, one of a plurality of generating means which are for generating character patterns on the basis of character font data,
   wherein the determining means sets, as the output specification, a specification in which quick generation of the pattern is regarded as important if the window is active.

2. An output controller according to claim 1, further comprising display means for displaying windows.

3. An output controller according to claim 1, wherein the controller outputs a character pattern using the one generating means selected by the selecting means.

4. An output controller according to claim 1, wherein the first discriminating means decides whether or not the window is active.

5. An output controller according to claim 1, wherein the output specification specifies which is regarded as more important, quickness during generation of character pattern using character font data or quality of the generated character pattern.

6. An output controller according to claim 1, further comprising second discriminating means for discriminating an edited object which is to be displayed in the window, wherein the determining means determining the output specification for the window on the basis of discrimination results provided by the first and the second discrimination means.

7. An output controller according to claim 1, wherein the selecting means selects one of the plurality of generating means in consideration of quickness of character pattern generation and quality of the generated character pattern.

8. An output controller according to claim 7, wherein the selecting means selects one of the plurality of generating means in consideration of a format of character font data and a size of character to be generated.

9. An output controller according to claim 8, wherein the selecting means selects one of the plurality of generating means in consideration of amount of memory required in generating the character pattern and fonts of the character to be generated.

10. An output controller which controls to output characters displayed in a window, comprising:
    first discriminating means for determining an output specification required for the window on the basis of a discrimination result obtained by the first discriminating means;
    determining means for determining an output specification required for the window on the basis of a discrimination result obtained by said first discriminating means; and
    selecting means for selecting, based on the output specification determined by the determining means, one of a plurality of generating means, which are for generating a character pattern on the basis of character font data,
    wherein the determining means sets, as the output specification, a specification in which quick generating of the pattern is regarded as important if an edited object is text.

11. An output controller according to claim 10, further comprising display means for displaying windows.

12. An output controller according to claim 10, wherein the controller outputs a character pattern using the generating means selected by the selecting means.

13. An output controller according to claim 10, wherein the first discriminating means decides whether or not an edited object is text.

14. A output controller according to claim 10, wherein the output specification specifies which is regarded as more important, quickness during generating of character pattern using character font data or quality of the generating character pattern.

15. An output controller according to claim 10, further comprising second discriminating means for discriminating an edited object which is to be displayed in the window, wherein the determining means sets the output specification of the window on the basis of discrimination results obtained by the first and the second discrimination means.

16. An output controller according to claim 10, wherein the selecting means selects one of the plurality of generating means in consideration of quickness of character pattern generation and quality of generating character pattern.

17. A output controller according to claim 16 wherein the selecting means selects one of the plurality of generating means in consideration of a format of character font data and a size of character to be generated.

18. An output controller according to claim 17, wherein the selecting means selects one of the plurality of generating means in consideration of amount of memory required in generating the character pattern and fonts of the character to be generated.

19. An output controller according to claim 2, wherein the controller outputs a character pattern using the generating means selected by the selecting means.

20. An output controller according to claim 14, wherein the selecting means selects one of the plurality of generating means in consideration of quickness of character pattern generation and quality of generated character pattern.

21. A method of outputting characters displayed in a window, comprising the steps of:

discriminating a state of a displayed window;

determining an output specification required for the window on the basis of a discrimination obtained in the discriminating step; and selecting, based on the output specification obtained in the determining step, one of a plurality of generating means that are for generating character patterns on the basis of character font data, wherein it is determined in the determining step that a specification in which quick generation of the pattern is regarded as more important if the window is active.

22. A method according to claim 21, further comprising the step of displaying windows in a display.

23. A method according to claim 21, further comprising the step of outputting a character pattern using the generating means selected in the selecting step.

24. A method according to claim 21, wherein in the discriminating step, a decision is made as to whether or not the window is active.

25. A method according to claim 21, wherein the output specification specifies which is regarded as more important, quickness during generation of character pattern using character font data or quality of the generated character pattern.

26. A method according to claim 21, further comprising the step of discriminating an edited object which is to be displayed in the window, and wherein the step of determining the output specification for the window is preformed on the basis of discrimination results obtained in the discriminating steps.

27. A method according to claim 21, wherein one of the plurality of generating means is selected in the selecting step in consideration of quickness of character pattern generation and quality of the generated character pattern.

28. A method according to claim 27, wherein one of the plurality of generating means is selected in the selecting step in consideration of a format of character font data and a size of character to be generated.

29. A method according to claim 28, wherein one of the plurality of generating means is selected in the selecting step in consideration of amount of memory required in generating the character pattern and fonts of the character to be generated.

30. A method of controlling to output characters displayed in a window, comprising the steps of:

discriminating an edited object displayed in a window;

determining an output specification required for the window on the basis of a discrimination result obtained in the discriminating step; and selecting means for selecting, based on the output specification determined in the determining step, one of a plurality of generating means that are for generating character patterns on the basis of character font data, wherein the determining step includes determining, as the output specification, a specification in which quick generation of the pattern is regarded as more important, if the edited object is a text.

31. A method according to claim 30, further comprising the step of displaying windows on a display.

32. A method according to claim 30, further comprising the step of outputting a character pattern using the generating means selected in the selecting step.

33. A method according to claim 30, wherein, a decision is made s to whether or not the edited object is a text.

34. A method according to claim 30, wherein the output specification specifies which is regarded as more important, quickness during generation of character pattern using character font data or quality of the generated character pattern.

35. A method according to claim 30, further comprising the step of discriminating an edited object which is to be displayed in the window, and wherein the determining step determines the output specification window on the basis of discrimination results obtained in the discriminating steps.

36. A method according to claim 30, wherein one of the plurality of generating means is selected in the selecting step in consideration of quickness of character pattern generation and quality of generated character pattern.

37. A method according to claim 36, wherein one of the plurality of generating means is selected in the selecting step in consideration of a format of character font data and a size of character to be generated.

38. A method according to claim 37, wherein one of the plurality of generating means is selected in the selecting step in consideration of amount of memory required in generating the character pattern and fonts of the character to be generated.

39. A method according to claim 22, further comprising the step of outputting a character pattern using the generating means selected in the selecting step.

40. A method according to claim 25, wherein one of the plurality of generating means is selected in the selecting step in consideration of quickness of character pattern generation and quality of generated character pattern.

* * * * *

UNITED STATES PATENT AND TRADEMARK OFFICE
CERTIFICATE OF CORRECTION

PATENT NO. : 5,524,198
DATED : June 4, 1996
INVENTOR(S) : HIROTSUGU MATSUMOTO ET AL.        Page 1 of 2

It is certified that error appears in the above-indentified patent and that said Letters Patent is hereby corrected as shown below:

COLUMN 3

Line 5, "(randomaccess" should read --(random-access--.

COLUMN 4

Line 58, "bezier," should read --Bezier,--.

COLUMN 7

Line 16, "Capable" should read --capable--.

COLUMN 12

Line 4, "step 11621." should read --step 1621.--.

COLUMN 13

Line 23, "bezier" should read --Bezier--.

COLUMN 17

Line 10, "claims:" should read --claims.--;
Line 64, "determining" (second occurrence) should read --determines--.

UNITED STATES PATENT AND TRADEMARK OFFICE
CERTIFICATE OF CORRECTION

PATENT NO. : 5,524,198
DATED : June 4, 1996
INVENTOR(S) : HIROTSUGU MATSUMOTO ET AL.

Page 2 of 2

It is certified that error appears in the above-indentified patent and that said Letters Patent is hereby corrected as shown below:

COLUMN 18

Line 39, "A" should read --an--.
Line 54, "A" should read --An-- and "claim 16" should read --claim 16,--.

COLUMN 19

Line 31, "preformed" should read --performed--.

COLUMN 20

Line 18, "wherein," should read --wherein--;
Line 19, "s" should read --as--.

Signed and Sealed this

Tenth Day of December, 1996

Attest:

BRUCE LEHMAN

Attesting Officer        Commissioner of Patents and Trademarks